United States Patent
Granato

(10) Patent No.: US 10,768,265 B2
(45) Date of Patent: Sep. 8, 2020

(54) SYSTEMS AND METHODS FOR DIRECTION FINDING USING COMPRESSIVE SENSING

(71) Applicant: Raytheon Company, Waltham, MA (US)

(72) Inventor: Matthew Granato, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 228 days.

(21) Appl. No.: 15/346,793

(22) Filed: Nov. 9, 2016

(65) Prior Publication Data

US 2018/0128892 A1 May 10, 2018

(51) Int. Cl.
| | |
|---|---|
| G01S 5/04 | (2006.01) |
| G01S 3/74 | (2006.01) |
| G01S 3/48 | (2006.01) |
| G01S 3/04 | (2006.01) |
| G01S 13/42 | (2006.01) |
| H01Q 21/06 | (2006.01) |

(52) U.S. Cl.
CPC .............. *G01S 3/74* (2013.01); *G01S 3/043* (2013.01); *G01S 3/48* (2013.01); *G01S 13/42* (2013.01); *H01Q 21/06* (2013.01)

(58) Field of Classification Search
CPC ... G01S 3/74; G01S 3/043; G01S 3/48; G01S 13/42; H01Q 21/06
USPC ......................................... 342/444, 417, 423
See application file for complete search history.

(56) References Cited

U.S. PATENT DOCUMENTS

| | | | |
|---|---|---|---|
| 5,355,141 A | 10/1994 | Graham et al. | |
| 5,495,256 A | 2/1996 | Piper | |
| 5,768,477 A | 6/1998 | Johnson et al. | |
| 5,892,700 A | 4/1999 | Haardt | |
| 6,127,974 A | 10/2000 | Kesler | |
| 6,377,213 B1 | 4/2002 | Odachi et al. | |
| 6,674,410 B1 | 1/2004 | Davidovitz | |
| 6,972,713 B2 | 12/2005 | Mosher et al. | |

(Continued)

OTHER PUBLICATIONS

Nalobin, et al.; "Utilization of the Array Factor for Narrowband Direction of Arrival Estimation"; 2015 IEEE International Symposium on Antennas and Propagation & USNC/URSI National Radio Science Meeting; Jul. 19-24, 2015; 2 Pages.

PCT International Search Report & Written Opinion of the ISA dated Nov. 28, 2017 from International Application No. PCT/US2017/048319; 20 Pages.

(Continued)

*Primary Examiner* — Chuong P Nguyen
(74) *Attorney, Agent, or Firm* — Daly, Crowley, Mofford & Durkee, LLP

(57) ABSTRACT

A determination of an angle of arrival of radiofrequency (RF) radiation can be made using compressive sensing techniques to inform a receiver portion of a radar system using fewer measurements and samples of the received signal. A method for compressive sensing at an array antenna includes forming a plurality subarrays of array elements from the array antenna such that each subarray includes two or more array elements, capturing data at the plurality of subarrays of array elements, modulating phase properties of the data captured at each of the subarrays, combining the modulated data from each of the plurality of subarrays to form a measurement having phase and magnitude measurements corresponding to the combined modulated data and determining angle of arrival information for the data using the measurement matrix.

20 Claims, 6 Drawing Sheets

(56) References Cited

U.S. PATENT DOCUMENTS

| | | | | |
|---|---|---|---|---|
| 7,064,710 | B1* | 6/2006 | Ksienski | H01Q 3/26 |
| | | | | 342/372 |
| 7,081,851 | B1* | 7/2006 | Lewis | H01Q 21/0087 |
| | | | | 342/372 |
| 7,233,285 | B2* | 6/2007 | Struckman | G01S 5/04 |
| | | | | 342/451 |
| 7,265,713 | B2* | 9/2007 | Lewis | H01Q 21/0087 |
| | | | | 342/372 |
| 7,427,953 | B2 | 9/2008 | Chiang et al. | |
| 7,705,779 | B2 | 4/2010 | Goldberg et al. | |
| 8,660,218 | B2 | 2/2014 | Maleh et al. | |
| 9,160,430 | B2* | 10/2015 | Maltsev | H04B 7/0417 |
| 9,277,590 | B2* | 3/2016 | Kokkinos | H01Q 1/246 |
| 9,329,265 | B2 | 5/2016 | Murad et al. | |
| 9,389,305 | B2* | 7/2016 | Boufounos | G01S 7/03 |
| 9,413,474 | B2* | 8/2016 | Chai | H04B 17/104 |
| 9,502,766 | B2* | 11/2016 | LePat | H01Q 3/34 |
| 9,537,587 | B2* | 1/2017 | Chai | H04B 17/104 |
| 9,654,264 | B2* | 5/2017 | Athley | H04L 5/0048 |
| 9,966,989 | B2* | 5/2018 | Bergamo | H04B 1/707 |
| 10,288,715 | B2* | 5/2019 | Bowden | G01S 3/043 |
| 10,288,716 | B2* | 5/2019 | Bowden | G01S 3/48 |
| 10,386,447 | B2* | 8/2019 | Badawy | G01S 3/38 |
| 2007/0222672 | A1 | 9/2007 | Hjelmstad et al. | |
| 2007/0285312 | A1* | 12/2007 | Gao | H01Q 1/246 |
| | | | | 342/367 |
| 2010/0033377 | A1 | 2/2010 | Straatveit | |
| 2013/0120192 | A1 | 5/2013 | Larson | |
| 2013/0181861 | A1 | 7/2013 | Zohar et al. | |
| 2013/0308717 | A1* | 11/2013 | Maltsev | H04B 7/0417 |
| | | | | 375/267 |
| 2014/0240163 | A1* | 8/2014 | Boufounos | G01S 7/03 |
| | | | | 342/27 |
| 2014/0266897 | A1* | 9/2014 | Jakoby | H01Q 1/38 |
| | | | | 342/368 |
| 2014/0269389 | A1* | 9/2014 | Bukkfejes | H04W 24/08 |
| | | | | 370/252 |
| 2015/0070217 | A1 | 3/2015 | Sharawi et al. | |
| 2015/0234030 | A1 | 8/2015 | Marr et al. | |
| 2016/0003931 | A1 | 1/2016 | Ledingham et al. | |
| 2018/0074152 | A1 | 3/2018 | Bowden | |
| 2018/0074153 | A1 | 3/2018 | Bowden | |
| 2019/0170848 | A1* | 6/2019 | Bowden | G01S 3/74 |
| 2019/0178973 | A1* | 6/2019 | Bowden | G01S 3/48 |

OTHER PUBLICATIONS

Wang, et al.; "Direction Estimation Using Compressive Sampling Array Processing"; IEEE/SP $15^{15}$ Workshop on Statistical Signal Processing; Aug. 31-Sep. 3, 2009; 3 Pages.

Krim, et al.; "Two Decades of Array Signal Processing Research"; IEEE Signal Processing Magazine; pp. 67-94; Jul. 1996; 28 Pages.

Xu, et al.; "A Subarray-Synthesis Based 2D DOA Estimation Method"; Journal of Electronics (China); vol. 23; No. 5; pp. 645-649; Sep. 2006; 5 Pages.

PCT Search Report & Written Opinion of the ISA dated Jul. 5, 2017 from International Pat. App. No. PCT/US2017/024015; 17 Pages.

U.S. Restriction Requirement dated Jul. 26, 2018 for U.S. Appl. No. 15/260,715; 6 Pages.

Response to U.S. Restriction Requirement dated Jul. 26, 2018 for U.S. Appl. No. 15/260,715; Response filed Aug. 8, 2018; 1 Page.

Ramasamy et al.; "Compressive Adaptation of Large Steerable Arrays;" IEEE Information Theory and Applications Workshop (ITA); Feb. 5, 2012; pp. 234-239; 6 pages.

Madhow; "Mm-Wave Sensing and communication;" Information—Theoretic Structure and Near-Optimal Aigorithms; USBC; Jun. 2016; 85 pages.

Article, "Radar Systems Engineering Lecture 9 Antennas, Part 2—Electronic Scanning and Hybrid Techniques"; Dr. Robert M. O'Donnell, IEEE New Hampshire Section, Guest Lecturer, Radar Systems Course 1 Antennas Part 2 Jan. 1, 2010; 70 Pages.

Article "Compressed Beamforming in Ultrasound Imaging"; Noam Wagner et al.; IEEE Transactions on Signal Processing, vol. 60, No. 9, Sep. 2012; 15 Pages.

International Preliminary Report on Patentability dated Mar. 21, 2019 for International Application No. PCT/US2017/024015; 10 Pages.

U.S. Notice of Allowance dated Jan. 25, 2019 for U.S. Appl. No. 15/260,715; 9 Pages.

U.S. Non-Final Office Action dated Nov. 1, 2018 for U.S. Appl. No. 15/260,715; 10 Pages.

Response to U.S. Non-Final Office Action dated Nov. 1, 2018 for U.S. Appl. No. 15/260,715; Response filed Nov. 28, 2018; 11 Pages.

PCT International Preliminary Report dated May 23, 2019 for International Application No. PCT/US2017/048319; 13 Pages.

Response to Rule 161(1) and 162 EPC Communication dated Apr. 16, 2019 for European Appl. No. EP17717569.2 as filed on Aug. 30, 2019; 12 pages.

\* cited by examiner

SYSTEMS AND METHODS FOR DIRECTION FINDING USING COMPRESSIVE SENSING

BACKGROUND

As is known in the art, direction finding (DF) may be described as a determination of a direction from which a received radio frequency (RF) signal was transmitted. To make such a determination, a DF system receives RF signals at each element in an array antenna. However, to increase the accuracy of some estimations, the size and number of elements in an array antenna can be increased. The increase in the number of array elements results in a larger set number of measurements and data to be analyzed, thus requiring a larger system architecture to process the data and increase a computation time to determine a direction from which a received radio frequency (RF) signal was transmitted.

SUMMARY

Concepts, systems and methods are provided herein for direction finding (DF) techniques using compressive sensing. In an embodiment, a determination of an angle of arrival of radiofrequency (RF) radiation can be made using compressive sensing techniques to inform the architecture of a radar system and thus require fewer electronic hardware and software resources.

Compressed sensing refers to a signal processing technique for acquiring and reconstructing a signal by exploiting the sparsity of the signal to reduce the number of samples corresponding to the signal to be analyzed. In an embodiment, using a combination of hardware and processing techniques, compressive sensing embodiments can compress the sparse domain into fewer measurements, and thus fewer samples.

Compressive sensing techniques as described herein, can be performed to recover one or more signals using fewer samples and/or measurements than traditional methods. A sparse representation of one or more received signals can be generated to determine location, amplitude, phase and angle of arrival information. In some embodiments, the compression may occur as the signal is received and thus before the signal is processed by a receiver portion of the radar system. During compressive sensing, portions of the received signal that contain information can be identified and extracted to generate the sparse representation. Thus, a condensed signal relative to the originally received signal is analyzed to determine location, amplitude, phase and angle of arrival information using the compressive sensing techniques described herein.

In one aspect, a method for compressive sensing at an array antenna is provided by forming a plurality subarrays of array elements from the array antenna such that each subarray includes two or more array elements, capturing data at the plurality of subarrays of array elements, modulating phase properties of the data captured at each of the subarrays, combining the modulated data from each of the plurality of subarrays to form a measurement matrix having phase and magnitude measurements corresponding to the combined modulated data and determining angle of arrival information for the data using the measurement matrix.

The array elements can be grouped based on a position of a respective array element in the array antenna to form the plurality of subarrays. In some embodiments, the array elements can be randomly grouped to form randomly interspersed subarrays. Data can be captured at phase centers of two or more array elements for each of the plurality of subarrays at a predetermined time period.

Phase properties of the captured data may be modulated using a set of phases known in the field as a kernel. This kernel may be drawn from a uniform random distribution. In some embodiments, phase properties may be modulated for a combination of data from two or more array elements for each of the plurality of subarrays using pseudorandom phase weighting.

In some embodiments, a dictionary matrix may be generated. Each entry in the dictionary matrix may correspond to an RF phasor predicted to be observed at one array element and a pair of angles from a range of angles corresponding to a field of view of the array antenna. Column vectors in the dictionary matrix may represent an idealized response to RF radiation as observed at each antenna element at one instant in time.

In an embodiment, the measurement matrix can be a mathematical model capturing the kernel and the electrical connectivity of the antenna. It linearly relates the observed RF at the antenna elements to the measurements captured by the embodiment at an instant in time. The measurements may be used to generate a direction finding signal indicative of a direction of a signal received by at least one of the plurality of subarrays. The angle of arrival information may be determined using at least one of a Mahalanbois distance method or a basis pursuit method.

In another aspect, a method for compressive sensing at an array antenna is provided by forming a plurality subarrays of array elements from the array antenna such that each subarray includes two or more array elements, capturing data at the plurality of subarrays of array elements, performing compressive sensing on the captured data at each of the plurality of subarrays, and generating a direction finding signal using the measurement and dictionary matrix and indicative of a direction of a signal received by at least one of the subarrays.

One or more subarrays from the plurality of subarrays may be selected to receive data from. In some embodiments, array elements may be selected randomly to form the plurality of subarrays having interspersed array elements.

Data may be captured at phase centers of two or more array elements for each of the plurality of subarrays at a predetermined time period. Phase properties of a combination of data from two or more array elements for each of the plurality of subarrays using pseudorandom phase weighting.

In another aspect, a system for compressive sensing at an array antenna is provided having a plurality of array elements formed into a plurality of subarrays such that each subarray includes two or more array elements, a plurality of receiver channels coupled to the plurality of subarrays to capture data at the plurality of subarrays and a plurality of phase shifters coupled to the plurality of receiver channels. The phase shifters can be configured to modulate phase properties of the data captured at each of the subarrays. The system may further comprise a summing module coupled to outputs of the plurality of phase shifters. The summing module can be configured to combine the modulated data from each of the plurality of subarrays and generate a measurement. The measurement matrix may include angle of arrival information for the captured data.

In some embodiments, each of the plurality of subarrays may comprise array elements within a predetermined distance from each other with respect to the array antenna. Each of the plurality of subarrays may comprise randomly interspersed array elements.

The receiver channels can be coupled to at least two or more array elements. In some embodiments, each of the sensing matrices can be coupled to at least one receiver channel and a phase shift module. The phase shift module can be configured to generate a pseudorandom phase weight to modulate phase properties of a combination of data from two or more array elements.

BRIEF DESCRIPTION OF THE DRAWINGS

The foregoing concepts and features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the concepts, systems and techniques described herein. Like numbers in the figures denote like elements.

DETAILED DESCRIPTION

Figure 1:
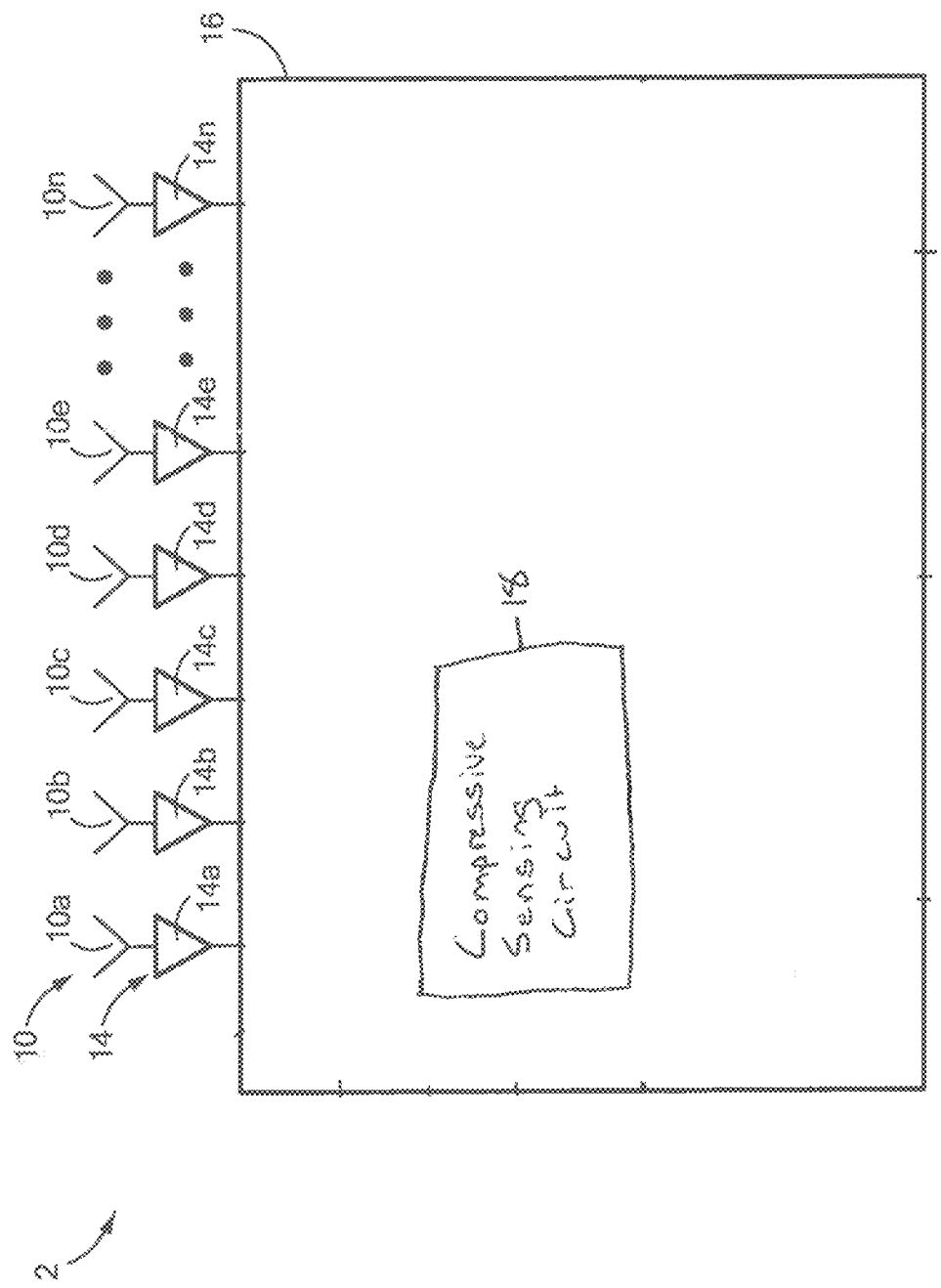
FIG. 1 is a block diagram of a radar system.

Now referring to FIG. 1, a radar system 2 includes a plurality of array elements 10a-10n, each having an output coupled to each input of a plurality of n low noise amplifiers (LNAs) 14a-14n. The output of each of LNAs 14a-14n is coupled to each of m inputs of a receiver module 16. It should be appreciated that in describing the above elements, the plurality of array elements 10a-10n may generally be referred to herein as array elements 10, and the plurality of LNAs 14a-14n may generally be referred to herein as LNAs 14.

Radar system 2 can be mounted on a variety of different air-based, ground-based, or water-based platforms, including but not limited to, an aircraft, ship, tower, ground vehicle or satellite. Radar system 2 may be provided as an array antenna configured to perform receive and/or transmit operations. For example, in some embodiments, radar system 2 may be provided as a direction finding system.

Radar system 2 can include a plurality of radio frequency (RF) chains, each corresponding to a signal path from an antenna element 10 to an input of receiver module 16. For example, each RF chain may include one antenna element 10 and one LNA 14.

Each of array elements 10 may represent an individual array element (e.g., antenna element) or a subarray of two or more array elements within radar system 2. In an embodiment, array elements 10 can be configured to receive a signal and/or transmit a signal, for example and without limitation, an RF signal generated (transmitted) or otherwise emitted from a beacon device. LNAs 14 may include any type of amplifier circuits capable of amplifying the received RF signal with minimal signal-to-noise degradation.

Array elements 10 may be coupled (e.g., directly coupled or communicatively coupled) to receiver module 16 though LNAs 14, such that RF signals received by the array elements 10 are coupled or otherwise provided to receiver module 16. In some embodiments, receiver module 16 may be provided as a multichannel digital receiver which processes the signals provided thereto (e.g. via one or more downconverter circuits and/or amplifier circuits).

Receiver module 16 can be configured to perform arithmetic (sum and difference) operations on signals provided thereto from array elements 10. In some embodiments, the output of receiver module 16 may be based upon an arrangement or configuration of the array elements 10 (e.g., grouping of array elements, combining of outputs of array elements) as will be discussed in greater detail below.

Receiver module 16 can be configured to compress, filter, down convert, and digitize signals provided thereto from array elements 10. In an embodiment, receiver module 16 can be configured to determine a direction and angle of arrival information of RF signals incident on array elements 10. Receiver module 16 may include compressive sensing circuit 18.

Compressive sensing circuit 18 may be configured to determine an angle of arrival of one or more signals incident on one or more subarrays 102a-102n and/or one or more array elements in any of the subarrays 102a-102n. In an embodiment, an angle of arrival (AoA) measurement is a method for determining the direction of propagation of a signal (e.g., RF wave) incident on an array antenna. The angle of arrival can be determined as a function of a phase difference between two individual array elements and a distance between the same two individual elements.

Figure 1A:
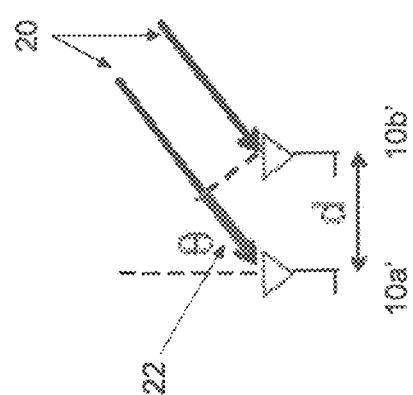
FIG. 1A is an illustration of an angle of arrival measurement.

For example, and referring to FIG. 1A, a signal 20 is incident on a first array element 10a' and a second array element 10b'. The first and second array element 10a', 10b' are separated by a distance, d. Due to the separation, each of the individual array elements in an array antenna (here first and second array elements 10a', 10b') can observe a different phase shift 22 of the received signal due to a difference in propagation distances from a signal source to the individual array elements (here first and second array elements 10a', 10b'). Thus, by determining the phase difference in the array antenna, the angle of arrival can be determined.

Compressive sensing circuit 18, as will be described herein, can be configured to capture data at one or more subarrays, compress, phase modulate and perform various calculations on the captured data to determine angle of arrival information. In some embodiments, compressive sensing circuit 18 can compress the data as the data is received at the one or more subarrays and perform various calculations to determine angle of arrival information.

It should be appreciated that in the illustrative embodiment of FIG. 1, each antenna element 10 is coupled to a respective one of the LNAs 14, each LNA antenna element 14 is coupled to a respective one input of receiver module 16. It should, however, be appreciated that in other embodiments this need not be so. In some embodiments, the number of elements in one level of a DF system may vary from the number of elements in a preceding and/or subsequent level in the DF system (e.g., not a 1:1 ratio between different elements). A DF system may have various combinations (ratios between different elements) of each of the above described elements based on a particular application of the DF system. For example, multiple antenna elements 10 could be coupled to a single LNA 14. Additionally, or alternatively, multiple LNAs 14 could be coupled to a single input of receiver module 16.

Figure 2:
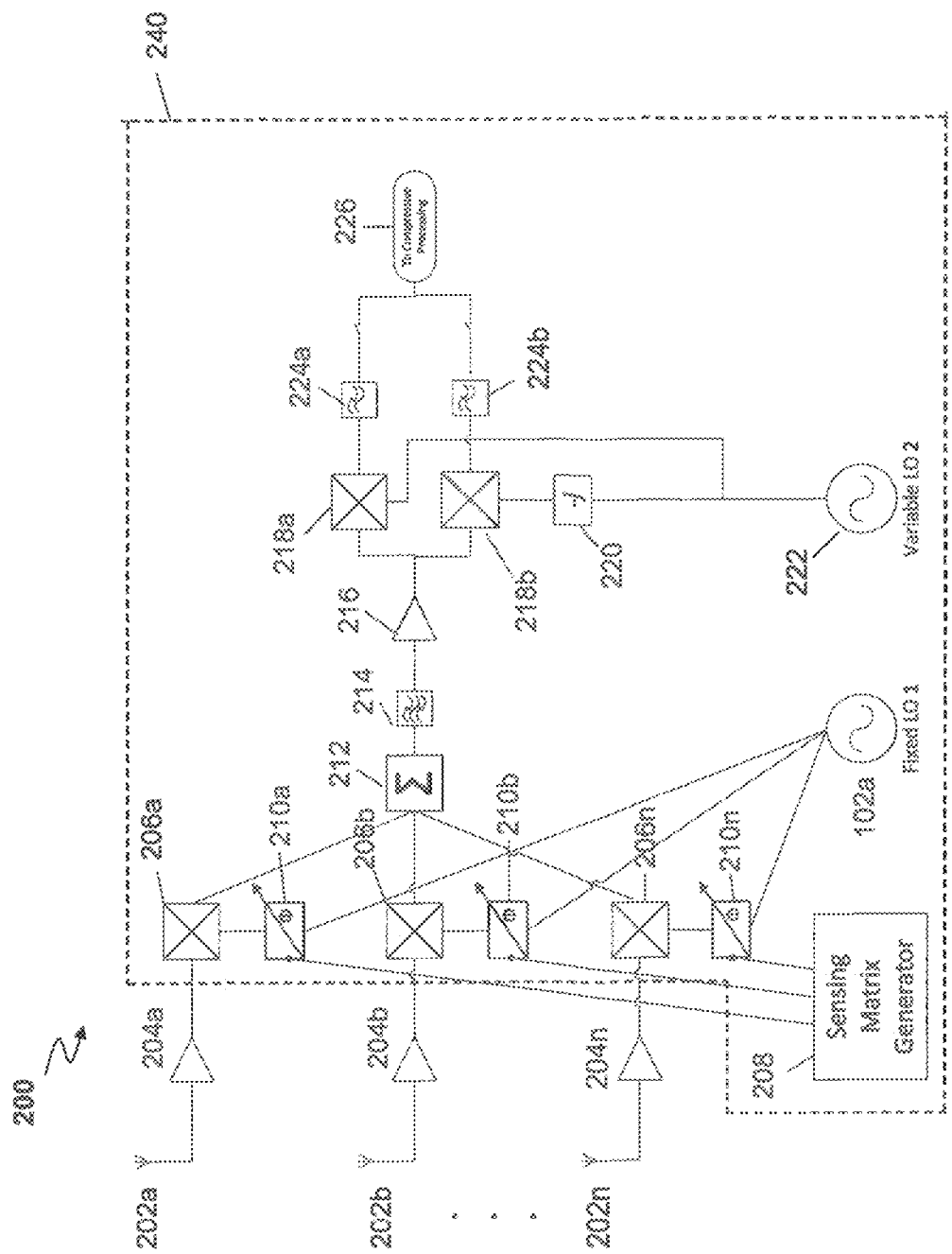
FIG. 2 is a block diagram of a plurality of subarrays coupled to a compressive sensing circuit.

Now referring to FIG. 2, a direction finding system 200 includes a plurality of subarrays 202a-202n. Each of the subarrays 202a-202n may comprise one or more individual antenna elements (also referred to as "elements" or "radiators"). Thus, each subarray 202a-202n may represent a single antenna element or multiple antenna elements.

Subarrays 202a-202n may be part of and/or form an array antenna. In some embodiments, array elements may be grouped together randomly to form randomly interspersed subarrays. In other embodiments, array elements may be grouped together based on a respective position of the respective array elements (e.g., group array elements next to or adjacent to each other, etc.) to form subarrays 202a-202n.

Figure 2B:
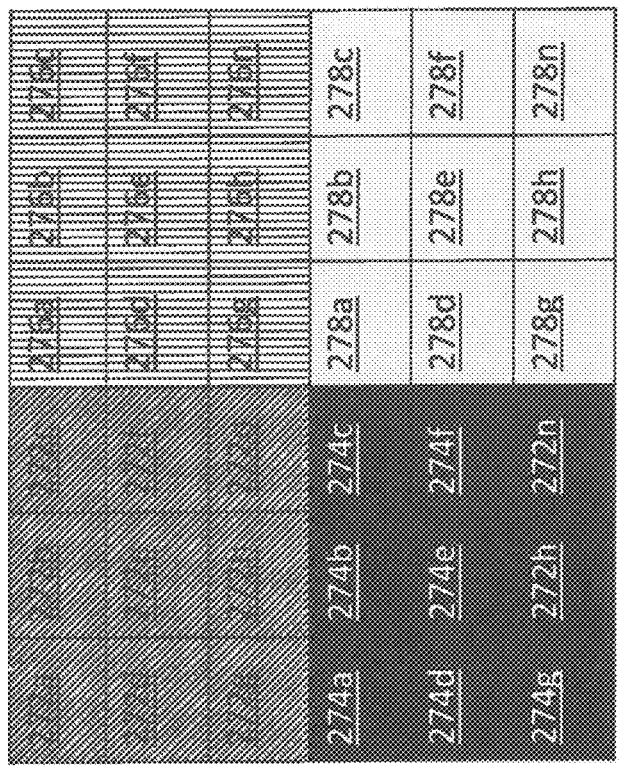
FIG. 2B is an illustration of an array antenna having subarrays grouped by location.
Figure 2A:
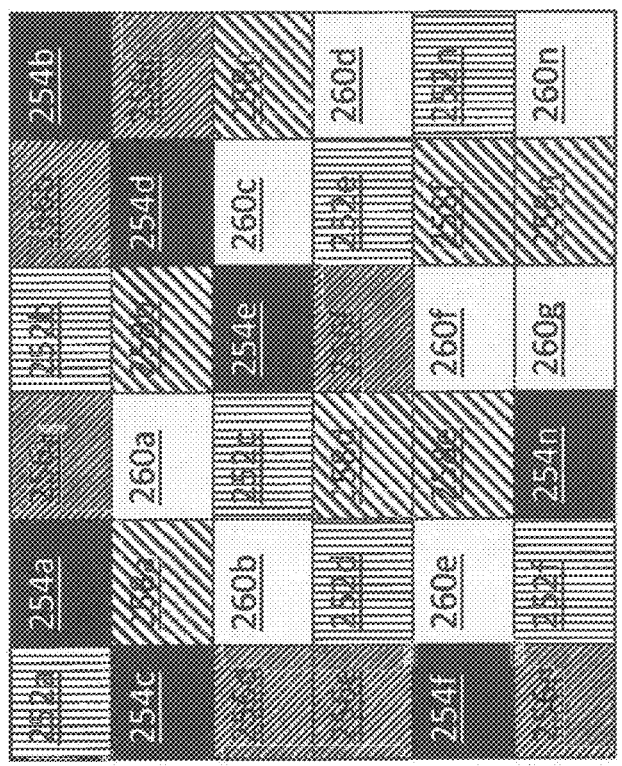
FIG. 2A is an illustration of an array antenna having randomly dispersed subarrays.

For example, and referring briefly to FIG. 2A, a first array antenna 250 is provided having a plurality of array elements 252a-252n, 254a-254n, 256a-256n, 258a-258n, 260a-260n. In first array antenna 250, the array elements 252a-252n, 254a-254n, 256a-256n, 258a-258n, 260a-260n are grouped together randomly to form randomly interspersed subarrays. For example, a first subarray may include a first grouping having array elements 252a-252n. A second subarray may include a second grouping having array elements 254a-254n. A third subarray may include a third grouping having array elements 258a-258n. A fourth subarray may include a fourth grouping having array elements 260a-260n. Thus, each subarray may include array elements that are randomly dispersed throughout array antenna 250.

Now referring to FIG. 2B, a second array antenna 270 is provided having a plurality of array elements 272a-272n, 274a-274n, 276a-276n, 278a-278n. In FIG. 2B, subarrays are formed by grouping array elements based on a respective position within array antenna 270. For example, a first subarray may include a first grouping having array elements 272a-272n. A second subarray may include a second grouping having array elements 274a-274n. A third subarray may include a third grouping having array elements 276a-276n. A fourth subarray may include a fourth grouping having array elements 278a-278n. Thus, each subarray may include array elements that are grouped in some order (here by position), as well as randomly grouped as shown in FIG. 2A.

Referring back to FIG. 2, each output of the plurality of subarrays 202a-202n may be coupled to at least one input of a low-noise amplifiers (LNA's) 204a-204n. The outputs of each of the plurality of LNAs 204a-204n can be coupled to one or more inputs of a compressive sensing circuit 240. In an embodiment, compressive sensing circuit 240 may be the same as or substantially similar to compressive sensing circuit 18 of FIG. 1. For example, compressive sensing circuit 240 can be configured to capture data at one or more subarrays, compress, phase modulate and perform various calculations on the captured data to determine angle of arrival information.

Compressive sensing circuit 240 may include a plurality of phase shifters 206a-206n. The outputs of each of the plurality of LNAs 204a-204n can be coupled to a first input of one of the plurality of phase shifters 206a-206n.

A second input of each of the plurality of phase shifters 206a-206n may be coupled to an output of at least one phase shift module 210a-210n. Each of the phase shift modules 210a-210n may have a first input coupled to an output of a measurement matrix generator 208 and a second output coupled to an output of a fixed local oscillator (LO) 221. The phase shift modules 210a-210n may receive a phase value from the measurement matrix generator 208 to be applied to data received from the subarrays 202a-202n and may receive a frequency value from the fixed LO 221, both the phase and frequency value can be applied to data received from the subarrays 202a-202n to modulate phase properties of the data.

An output of each of the phase shifters 206a-206n may be coupled to inputs of the summing module 212. An output of the summing module 212 is coupled to an input of a first filter 214. An output of the first filter 214 is coupled to an input of an amplifier 216. A first output of amplifier 216 is coupled to a first input of a first mixer 218a and a second output of amplifier 216 is coupled to a first input of a second mixer 218b.

A second input of first mixer 218a is coupled to an output of variable LO 222 and a second input of second mixer 218b is coupled to the output of variable LO 222. An output of first mixer 218a is coupled to an input of a second filter 224a and an output of second mixer 218b is coupled to an input of a third filter 224b. Outputs of both the second filter 224a and third filter 224b are coupled to an input of a compressive sensing module 226.

In operation, data may be captured at one or more of subarrays 202a-202n. In some embodiments, the data may be captured at phase centers of one or more array elements for one or more of the plurality of subarrays. The data may be captured at predetermined time period or point in time. The data may be provided to an input of LNAs 204a-204n. LNAs 204a-204n may be configured to amplify the data (e.g., received RF signal) with minimal signal-to-noise degradation. In other embodiments, the data may be provided directly from the subarrays to compressive sensing circuit 240.

LNAs 204a-204n can provide the data to a first input of one of the plurality of phase shifters 206a-206n. Phase shifters 206a-206n can be configured to modulate phase properties of the data. For example, phase shifters 206a-206n may modulate the phase properties using a phase drawn from a uniform random distribution. In some embodiments, phase shifters 206a-206n may modulate phase properties of a combination of data from two or more array elements for each of the plurality of subarrays using pseudorandom phase weighting.

To modulate the phase properties, each of the phase shifters 206a-206n can be configured to generate a phase modulating signal. The phase shifters 206a-206n can apply the phase modulating signal to the data. In an embodiment, the phase modulating signal may apply a time shift applied to the data (e.g., received signal) in the frequency domain. To get the time shift and frequency information to generate the phase modulating signal, phase shifters 206a-206n may receive a phase value from the measurement matrix generator 208 to be applied to data received from the subarrays 202a-202n and may receive a frequency value from the LO 221. In an embodiment, both the phase and frequency value can be applied to data received from the subarrays 202a-202n to generate the phase modulating signal and thus, modulate phase properties of the data.

Phase shifters 206a-206n may provide the modulated data to inputs of the summing module 212. Summing module 212 can be configured to combine the modulated data from each of the plurality of subarrays 202a-202n to form a compressed signal. The compressed signal may include phase and magnitude information corresponding to the combined modulated data. A first measurement matrix may be formed that is representative of the compressed signal.

In some embodiments, IQ demodulation may be performed on the compressed signal and thus performed on each entry in the measurement matrix to separate the respective entry values (e.g., vectors) into I and Q components (i.e., in-phase and quadrature components). The IQ demodulation may be performed to measure and determine amplitude and phase data for each of the entries in the measurement matrix (or measurement vector). Using the amplitude and phase data, angle of arrival information can be determined and a reconstruction of the original received signal can be performed.

To perform the IQ demodulation, summing module 212 may provide the compressed signal to an input of first filter 214. First filter 214 can be configured to filter and/or pass portions of the compressed signal (e.g., data) having a frequency within acceptable range with respect to a cut-off frequency. First filter 214 may be provided as a low pass filter, band pass filter or a high pass filter. The output of first filter 214 is coupled to an input of amplifier 216. Amplifier 216 can be configured to modify a power (e.g., amplitude) of the received data. The first output of amplifier 216 provides the data to a first input of a first mixer 218a and a second output of amplifier 216 provides the data to a first input of a second mixer 218b.

First and second mixer 218a, 218b can be configured to modify a frequency of the data by applying (mixing) the received data with a second signal. As illustrated in FIG. 2, a second input of first mixer 218a is coupled to an output of LO 222 and a second input of second mixer 218b is coupled to the output of LO 222. First and second mixer 218a, 218b can receive a frequency signal from LO 222 and apply the variable frequency signal to the received data.

First mixer 218a can provide data to second filter 224a and second mixer 218b can provide data to third filter 224b. Second and third filters 224a, 224b can be configured to filter and/or pass portions of the data having a frequency within acceptable range with respect to a cut-off frequency. Second and third filters 224a, 224b may be provided as a low pass filter, band pass filter or a high pass filter. Outputs of both the second filter 224a and third filter 224b are coupled to an input of a compressive sensing module 226. The output of compressive sensing module 226 may be the output of compressive sensing circuit 240. The output of compressive sensing circuit 240 can be a second measurement matrix having phase and magnitude measurements corresponding to the combined modulated data and/or angle of arrival information of one or more signals incident on the array antenna. The second measurement matrix may be different from the first measurement matrix as it represents the compressed signal after IQ demodulation has been performed on the compressed signal. In some embodiments, the output of compressive sensing circuit 240 may be referred to herein as a measurement and can be a direction finding signal having angle of arrival information.

It should be appreciated that although direction finding system 200 is generally described in terms of receive operations, direction finding system 200 may be configured to perform receive operations, transmit operations or a combination of receive/transmit operations.

Figure 3:
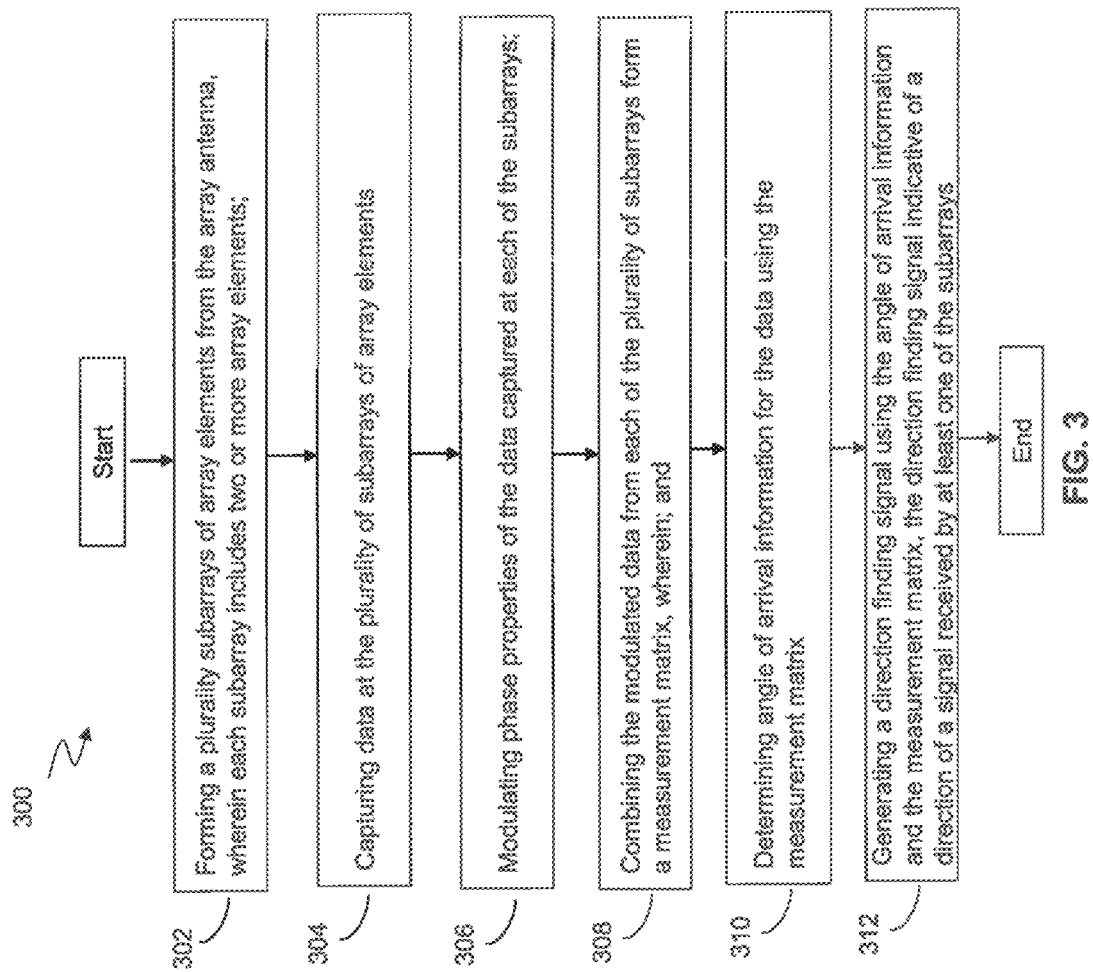
FIG. 3 is a flow diagram of a method for performing compressive sensing.

Now referring to FIG. 3, a method 300 for compressive sensing at an array antenna is provided. The compressive sensing techniques, as described herein, can be performed to recover one or more signals using fewer samples and/or measurements than traditional methods. For example, a sparse representation of one or more received signals can be generated to determine location, amplitude, phase and angle of arrival information. In some embodiments, portions of the received signal that contain information can be identified and extracted to generate the sparse representation. Thus, a smaller signal is analyzed to determine location, amplitude, phase and angle of arrival information using the compressive sensing techniques described herein. A smaller signal may refer to a signal that has been condensed or reduced such that it contains fewer samples than an original and/or previous version of the signal.

The compressive sensing method begins at block 302, by forming a plurality of subarrays from array elements in an array antenna. The array antenna may include one or more individual array element (also referred to as "antenna elements," "elements" or "radiators"). Each of the subarrays can be formed from one or more individual array elements. Thus, each subarray may represent a single array element or multiple array elements.

The individual array elements can be grouped together in a variety of different methods to form one or more subarrays ad described above with respect to FIGS. 1-2B.

In some embodiments, the array elements can be grouped together to reduce a number of samples (e.g., measurements) taken of one or more received signals. For example, a minimum number of samples needed to accurately reconstruct the received signals can be determined based at least on analysis of a restricted isometry property and mutual incoherence of a dictionary and/or measurement matrices formed to represent the array antenna. As used herein, accurately may refer to an acceptable range in which a reconstructed signal corresponds to and/or represents the received signal. Thus, in some embodiments, the number of array elements in each subarray may be based at least in part on the minimum number of samples needed to accurately reconstruct the received signals. For example, in one embodiment having 256 array elements, it may be determined that the received signal can be accurately reconstructed using 16 samples and thus, the 256 array elements can be grouped into 16 subarrays having 16 array elements each. The data from the 16 subarrays may be further compressed to identify sparsity in the received signal and further reduce the amount of data to be analyzed.

The restricted isometry property and mutual incoherence requirements may be used to ensure that all of the potential inputs are present to a significant degree in the measurement. These criteria are described in the equations below, where theta ($\theta$) is the sparse vector, K is the number of active sparse signal components at any time (sparsity), epsilon ($\epsilon$) is the maximum power change in the compression which, as a rule of thumb, should be less than 0.5 or 3 dB for detectability, phi ($\phi$) is the measurement matrix, psi ($\psi$) is the dictionary, M is the number of measurements, c is a constant, mu ($\mu$) is the coherence function, and N is the number of possible sparse signal components. In some embodiments, it can be faster to evaluate the mutual incoherence requirement than the restricted isometry property.

$$RIP: \forall \theta \bigg| \|\theta\|_0 \leq 3K: 1-\epsilon \leq \frac{\|\Phi\Psi\theta\|_2}{\|\theta\|_2} \leq 1+\epsilon$$

$$\text{Mutual Incoherence: } M \geq cK\mu(\Phi\Psi)\log\left(\frac{N}{K}\right),$$

$$\text{where } \mu(\Phi\Psi) = \max_{m,n}|\langle \phi_m, \psi_n \rangle|$$

At block 304, data can be captured at one or more of the plurality of subarrays. The data may be presentative of data from multiple array elements within a respective subarray. In an embodiment, one or more radio frequency (RF) signals may be incident on and thus received at one or more of the subarrays and/or one or more array elements within a respective subarray. Data can be captured corresponding to the received RF signals. For example, the data may include angle of arrival, amplitude, phase, and/or a polarization information of the received signal. The data may be sampled at antenna phase centers of one or more array elements in a respective subarray. In some embodiments, the data can be represented and stored as complex values (e.g., I/Q data).

The data can be captured at each of the subarrays at one or more instantaneous points in time (e.g., a snapshot during a dwell time) or over one or more predetermined time periods. In some embodiments, the data can be captured at each of the subarrays at different time periods. In an embodiment, data can be captured at predetermined or selected subarrays. For example, data may be captured for a first and third subarray in the array antenna but not captured at a second subarray over the same time period. Thus, for a specific time period, data may be captured for selected subarrays and ignored at other subarrays within the same array antenna.

In some embodiments, multiple samples (e.g., captured data) may be taken of a single received signal at a single instantaneous point in time at one or more subarrays. In other embodiments, multiple samples may be taken of a plurality of different received signals at different instantaneous points in time at one or more subarrays. In one embodiment, the data may correspond to different received signals. It should be appreciated, that the number of data samples taken may vary depending upon a variety of factors, including but not limited to, a number of array elements, a number of subarrays used and/or the requirements of a particular application.

The data captured at each of the subarrays can be used to generate a dictionary matrix (e.g., dictionary formulation) corresponding to the array antenna. In an embodiment, the dictionary matrix can be generated using a basis function corresponding to an angular frequency of one or more received signals present at each of the subarrays in a particular array antenna. For example, the angular frequencies in the signals incident on the array antenna can be represented as a phasor, having a constant magnitude and a phase value that corresponds to a direction (e.g., angle) of a received RF signal. Thus, each entry in the dictionary matrix may include the phasor information for signals received at the array antenna. The dictionary formulation can be represented by matrix provided below:

$$\Psi = \begin{bmatrix} e^{j\phi_{1,1}} & \cdots & e^{j\phi_{1,N}} \\ \vdots & \ddots & \vdots \\ e^{j\phi_{1L,1}} & \cdots & e^{j\phi_{1L,N}} \end{bmatrix}$$

Where $\psi$ represents the dictionary formulation, L corresponds to a number of subarrays or array elements in an array antenna, N corresponds to a number of combinations of azimuth and elevation values for a specific range (e.g., over a specific field of view (FOV) e.g., ±P° az, ±Q° el), and $e^{j\Theta}$ represents complex values of the captured data in exponential form.

A sparse vector may be generated representing a sparse form of the received signals. In some embodiments, in compressive sensing, a signal is received from an environment that has some underlying structure that permits a sparse representation. Thus, the underlying structure of the signal is that RF radiation from a particular angle of arrival creates a predictable angular frequency across the antenna subarrays or elements. Entries in the sparse vector may correspond to the angles of arrival of particular RF sources. The non-zero elements or elements having a value above a threshold may represent portions of the received signal having information needed to reconstruct the received signal. Portions of the data that have a zero value or values that are below the threshold can be represented by a zero value in the sparse vector. Thus, the sparse vector can be used to generate a model of the received signal by multiplying the sparse vector and the dictionary matrix. In an embodiment, this model can be based on the superposition of RF energy. The sparse vector can represent the magnitude and angle of arrival (AoA) of the set of RF sources in the environment. The contribution of each RF source, as entry n in the sparse vector, has an angular frequency represented by column n in the dictionary. The summary signal present at the antenna before the compressive device is then the sum of each non-zero element of the sparse vector with the dictionary column selected by the corresponding index of each of the non-zero sparse vector elements.

The product of the dictionary formulation (dictionary matrix above) multiplied by the sparse vector can provide excitation values on each of the subarrays in the array antenna. The phase shift modules can then apply the phase shift specified in the kernel to the excitations.

At block 306, phase properties of the data captured may be modulated for one or more of the subarrays. The phase properties of the data captured at one or more of the subarrays can be modulated using the embodiments described above with respect to FIGS. 1-2B. For example, the phase modulated data may correspond to one or more RF signals that were received at one or more of the subarrays or one or more array elements in the one or more subarrays.

In some embodiments, phase shifters can receive the phase values to modify the data from one or more phase shift modules. For example, a second input of each of the phase shifters can be coupled to an output a phase shift module to receive a phase modulating signal (e.g., mixing signal). The phase modulating signal may be a combination of a phase drawn from a uniform random distribution (generated by a measurement matrix generator coupled to the phase module) and a fixed frequency (received from a LO coupled to the phase module). The phase shift modules can generate a phase mixing signal for the respective phase shifters the phase shift module is coupled to. The phase shifters can apply the phase modulating signal to the captured data (e.g., mixing an RF signal with a phase modulated signal) to modulate phase properties of the captured data.

In some embodiments, the phase can be modulated based on a phase of the incoming RF signal. For example, the phase generated by the measurement matrix generator may be based at least in part on the phase of the incoming RF signal received at one or more of the subarrays.

The modulated data may be represented by a measurement matrix represented by the matrix provided below:

$$\Phi = \begin{bmatrix} e^{j\phi} & 0 & 0 & \cdots & e^{j\phi} & 0 \\ 0 & e^{j\phi} & e^{j\phi} & \cdots & 0 & e^{j\phi} \end{bmatrix}$$

Where $\Phi$ represents the measurement matrix and $e^{j\Theta}$ represents complex values of data captured at a subarray in exponential form. In an embodiment, the measurement matrix represents the phase modulated data captured at each of the subarrays. For example, a number of columns in the measurement matrix may correspond to the number of total array elements in an array antenna. However, the number of non-zero entries (here represented as $e^{j\varphi}$) in the measurement matrix corresponds to the number of channels formed. For example, in one embodiment of an array antenna having 256 array elements associated into 16 channels, the measurement matrix can have 256 columns. However, only 16 entries in each measurement matrix row will be non-zero, the entries corresponding to data from at least one channel. In an embodiment, the measurement matrix provides a compressed representation of the data originally captured at the array antenna. The data has been reduced to information needed to reconstruct the original signal within an acceptable accuracy.

At block 308, the modulated data from each of the plurality of subarrays can be combined to form a measurement. The modulated data can be combined into a single vector to form the measurement. In an embodiment, the measurement may include a compressed representation of the originally captured data at the subarrays that has been phase shifted.

In some embodiments, the measurement may include the summation of the non-zero elements in the measurement matrix. For example, each of the non-zero elements can be summed together to form the measurement using matrix multiplication. Thus, the modulated and compressed data from the subarrays may be combined to form the measurement.

In some embodiments, the measurement may be represented by the following equation:

$$Y = \Phi(\Psi\Theta + \upsilon)$$

Where Y represents the measurement, $\Phi$ represents the measurement matrix, $\Psi$ represents the dictionary matrix, $\Theta$ represents the sparse vector and $\upsilon$ represents a noise value. Thus, the measurement can be generated by performing arithmetic operations on the values in each of the measurement matrix, dictionary matrix and sparse vector. Further, in some embodiments, a noise factor can be included to account for noise. For example, values in the dictionary matrix can be multiplied by the values in the sparse vector. A noise factor can be summed with the product of the dictionary matrix and sparse vector. The result can be multiplied by the values in the measurement matrix to generate the measurement.

At block 310, angle of arrival information may be determined for the data using the measurement. In some embodiments, the angle of arrival information may be determined using a Mahalanbois distance method.

In an embodiment, for each of the entries (values) in the measurement, a distance may be calculated from the respective entry to an arbitrarily selected test point. In some embodiments, the test point may represent previous data and calculations from the same array antenna. A distance metric may be selected to perform the calculation. For example, and without limitation, a Mahalanbois distance (equation 3 below) may be used to perform the calculation.

$$D_{mahal} = \sqrt{(\bar{x} - \bar{p})^T S^{-1}(\bar{x} - \bar{p})} \qquad \text{Eq. 3}$$

where $\bar{x}$ represents the Xth p-table entry in the measurement and $\bar{p}$ represents the test point data.

In other embodiments, the angle of arrival information may be determined using the data generated using a basis pursuit technique. The basis pursuit technique may be a L1-minimization technique and can decompose the values (e.g., vector values) in the measurement into an optimal superposition of dictionary elements, where optimal means having the smallest L1 norm of coefficients among all such decompositions. The basis pursuit technique may be presented by the following formula:

$$\min\|\theta\|_0 \text{ subject to } y = A\theta$$

where $\theta$ is a N×1 solution vector (sparse vector for the received signal), y is a M×1 vector of observations (measurements of the received signal), A is a M×N transform matrix (or sensing matrix) and M<N. In some embodiments, A represents the product of the measurement matrix multiplied by the dictionary matrix (e.g., $A = \Phi\psi$). In an embodiment, using the basis pursuit technique, the L1 norm values for each entry (e.g., each vector) in the measurement can be determined. In an embodiment, the L1 norm of a vector may correspond to the absolute value of the respective vector. Thus, the vector in the measurement having the smallest L1 norm may be determined. In an embodiment, the vector in the measurement having the smallest L1 norm may correspond to the angle of arrival of the received signal. The smallest L1 norm value may indicate the minimum distance to a point of original of the received signal. For example, in some embodiments, the L1 norm may form a "conic manifold," whereby the L1 norm gets regularly smaller (decreases in value) the closer you get to the correct angle of arrival. Thus, the optimization may be a gradient descent that takes the fact that the conic manifold is sloped toward the best estimation to go straight toward the optimum.

It should be appreciated that other reconstruction techniques may be used. For example, in some embodiments, machine learning reconstruction and/or machine learning estimation techniques may be used.

At block 312, a direction finding signal can be generated using the measurement and the sensing matrix. The direction finding signal may be indicative of a direction of one or more signals received by at least one of the subarrays. For example, the direction finding signal may indicate the angle of arrival of the received signal. In some embodiments, the estimated angle of arrival of the signal may be a two-dimensional (2D) estimation.

The direction finding signal may be generated using the information from the basis pursuit technique. For example, the direction finding signal may indicate the vector in the measurement having the smallest L1 norm and thus corresponding to the angle of arrival of the received signal. The direction finding signal may be generated indicating the minimum distance point to the point of original of the received signal.

Figure 4:
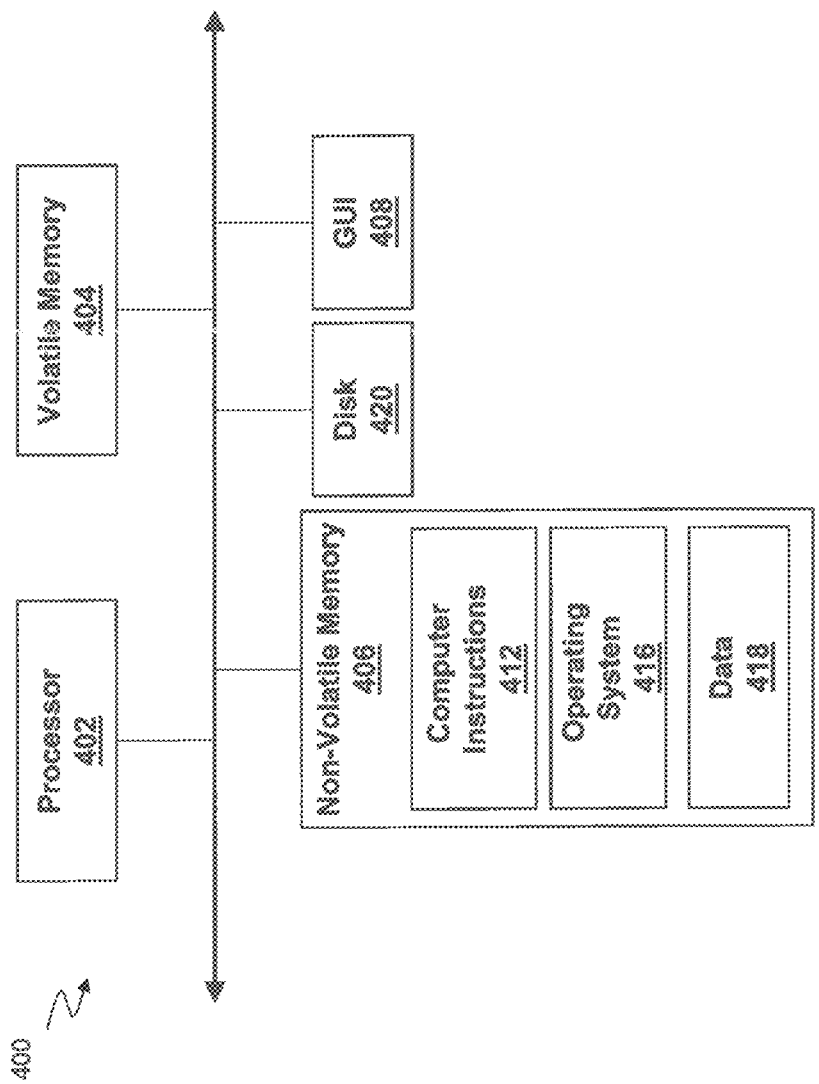
FIG. 4 is a block diagram of an embodiment of a processing system for performing compressive sensing in accordance with the techniques described herein.

Referring now to FIG. 4, a computer 400 includes a processor 402, a volatile memory 404, a non-volatile memory 406 (e.g., hard disk), a graphical user interface (GUI) 408 (e.g., a mouse, a keyboard, a display, for example) and a computer disk 420. The non-volatile memory 406 stores computer instructions 412, an operating system 416 and data 418. In an embodiment, the data 418 may include data collected corresponding to signals received at one or more array elements. The data may include complex I/Q data representing the signal. For example, in some embodiments, the data may include complex voltage signals representative of angle, amplitude, phase, and/or a polarization of the signal. In embodiment, the data may include an angle measurement of the signal relative to the phase center of the respective array element that received the signal. In an embodiment, the data may be a snapshot of the signal at a predetermined period of time or over a predetermined time period.

In some embodiments, non-volatile memory 406 may include one or more look-up tables for storing and organizing captured data corresponding to signals received at one or more array elements, as well as any tables or matrices generated using the samples of the captured data. In one example, the computer instructions 412 are executed by the processor 402 out of volatile memory 404 to perform all or part of the method (or process) 300 of FIG. 3.

In an embodiment, computer 400 may be the same as or substantially similar to each of the components of receiver module 16 and compressive sensing circuit 18 of FIG. 1, compressive sensing circuit 240, measurement matrix generator 208, phase shifters 206a-206n, phase shift modules 210a-210n and summing module 212 of FIG. 2. Computer 400 may perform all of the same functions and be configured to receive and generate the same data as each of receiver module 16 and compressive sensing circuit 18 of FIG. 1, compressive sensing circuit 240, measurement matrix generator 208, phase shifters 206a-206n, phase shift modules 210a-210n and summing module 212 of FIG. 2. For example, computer 400 may be configured to perform real time direction finding determinations, capture data corresponding to signals incident on or one or more array elements and generate tables and/or matrices to identify a direction of arrival of a signal.

Method 300 is not limited to use with the hardware and software of FIG. 4; they may find applicability in any computing or processing environment and with any type of machine or set of machines that is capable of running a computer program. Method 300 may be implemented in hardware; software, or a combination of the two. Method 300 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform method 300 and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. Alternatively, the system may be implemented, at least in part, as firmware.

A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform method 300. Method 300 may also be implemented as a machine-readable storage medium, configured with a computer program, where upon execution, instructions in the computer program cause the computer to operate in accordance with method 300.

Method 300 may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

A number of embodiments of the disclosure have been described. Nevertheless, it will be understood that various modifications may be made without departing from the spirit and scope of the disclosure. Elements of different embodiments described herein may be combined to form other embodiments not specifically set forth above. Other embodiments not specifically described herein are also within the scope of the following claims.

What is claimed:

1. A method for compressive sensing at an array antenna, the method comprising:
   forming a plurality of subarrays of array elements from the array antenna, wherein a count of array elements in any of the plurality of subarrays is based at least in part on a minimum number of samples needed to reconstruct a received signal, the minimum number of samples being determined based on a restricted isometry property of the array antenna and a mutual incoherence of at least one of a dictionary matrix associated with the array antenna and a measurement matrix associated with the array antenna;
   during any given time period, capturing data at a subset of the plurality of subarrays of array elements using a plurality of receiver channels coupled to the plurality of subarrays;
   modulating phase properties of the data captured at each of the subarrays to produce modulated data, the modulating being performed by using a plurality of phase shifters coupled to the plurality of receiver channels;
   combining the modulated data from each of the plurality of subarrays to form a measurement having phase and magnitude measurements corresponding to the combined modulated data using a summing module; and
   determining angle of arrival information for the data using the measurement.

2. The method of claim 1, further comprising grouping array elements based on a position of a respective array element in the array antenna. to form the plurality of subarrays.

3. The method of claim 1, further comprising randomly grouping array elements to form randomly interspersed subarrays.

4. The method of claim 1, further comprising capturing data at phase centers of two or more array elements for each of the plurality of subarrays at a predetermined time period.

5. The method of claim 1, further comprising modulating the phase properties using a phase drawn from a uniform random distribution.

6. The method of claim 1, further comprising modulating the phase properties of a combination of data from two or more array elements for each of the plurality of subarrays using pseudorandom phase weighting.

7. The method of claim 1, further comprising generating the dictionary matrix, wherein each entry in the dictionary matrix corresponds to at least one array element and a pair of angles from a range of angles corresponding to a field of view of the array antenna.

8. The method of claim 1, further comprising generating the measurement matrix based on the plurality of subarrays, wherein each row in the measurement matrix corresponds to at least one subarray.

9. The method of claim 1, further comprising using the measurement to generate a direction finding signal indicative of a direction of a signal received by at least of the plurality of subarrays.

10. The method of claim 1, wherein determining the angle of arrival information further comprises using at least one of a Mahalanbois distance method or a basis pursuit method.

11. A method for compressive sensing at an array antenna, the method comprising:
forming a plurality of subarrays of array elements from the array antenna, wherein a count of array elements in any of the plurality of subarrays is based at least in part on a minimum number of samples needed to reconstruct a received signal, the minimum number of samples being determined based on a restricted isometry property of the array antenna and a mutual incoherence of at least one of a dictionary matrix associated with the array antenna and a measurement matrix associated with the array antenna;
during any given time period, capturing data using a plurality of receiver channels coupled at a subset of the plurality of subarrays of array elements using a plurality of receiver channels coupled to the plurality of subarrays;
performing compressive sensing on the captured data at each of the plurality of subarrays using a compressive sensing circuit;
generating a measurement using the captured data from each of the plurality of subarrays using the compressive sensing circuit; and
generating a direction finding signal using the measurement and indicative of a direction of a signal received by at least one of the subarrays using the compressive sensing circuit.

12. The method of claim 11, further comprising selecting one or more subarrays from the plurality of subarrays with which to receive data from.

13. The method of claim 11, further comprising selecting randomly interspersed array elements to form the plurality of subarrays.

14. The method of claim 11, further comprising capturing data at phase centers of two or more array elements for each of the plurality of subarrays at a predetermined time period.

15. The method of claim 11, further comprising modulating the phase properties of a combination of data from two or more array elements for each of the plurality of subarrays using pseudorandom phase weighting.

16. A system for compressive sensing at an array antenna, the system comprising:
a plurality of array elements formed into a plurality of subarrays, wherein a count of array elements in any of the plurality of subarrays is based at least in part on a minimum number of samples needed to reconstruct a received signal, the minimum number of samples being determined based on at least a restricted isometry property of the array antenna and a mutual incoherence of at least one of a dictionary matrix associated with the array antenna and a measurement matrix associated with the array antenna;
a plurality of receiver channels coupled to the plurality of subarrays to capture data at a subset the plurality of subarrays during any given time period;
a plurality of phase shifters coupled to the plurality of receiver channels, wherein the phase shifters modulate phase properties of the data captured at each of the subarrays to produce modulated data; and
a summing module coupled outputs of the plurality of phase shifters, the summing module configured to combine the modulated data from each of the plurality of subarrays and generate a measurement, wherein the measurement includes angle of arrival information for the data.

17. The system of claim 16, wherein each of the plurality of subarrays comprise array elements within a predetermined distance from each other with respect to the array antenna.

18. The system of claim 16, wherein each of the plurality of subarrays comprise randomly interspersed array elements.

19. The system of claim 16, wherein each of the receiver channels is coupled to at least two or more array elements.

20. The system of claim 16, wherein each of the subarrays are coupled to at least one receiver channel and a phase shift module, wherein the phase shift module is configured to generate a pseudorandom phase weight to modulate phase properties of a combination of data from two or more array elements.

* * * * *